June 4, 1957 W. HERMES 2,794,921

CRYSTAL-CONTROLLED OSCILLATOR

Filed Nov. 5, 1954

INVENTOR
WILLEM HERMES
BY Fred M. Vogel
AGENT

United States Patent Office 2,794,921

Patented June 4, 1957

2,794,921

CRYSTAL-CONTROLLED OSCILLATOR

Willem Hermes, Hilversum, Netherlands, assignor, by mesne assignments, to North American Philips Company, Inc., New York, N. Y., a corporation of Delaware Application November 5, 1954, Serial No. 466,967

2 Claims. (Cl. 250—36)

The invention relates to crystal-controlled oscillators. In such oscillators the produced output is limited by the maximum admissible current in the crystal circuit. If the current exceeds this admissible maximum, the properties of the crystal are likely to vary greatly with a resultant variation of the oscillator frequency, whilst in extreme cases the crystal might break. If in the crystal circuit temporarily larger currents may occur than in normal operation, as may, for example, be the case in switching-in or synchronizing the oscillator, the circuit arrangement must be dimensioned such that these temporarily occurring larger currents at a maximum become equal to the maximum admissible current. As a result, however, one must be content in normal operation with smaller currents, that is with a smaller output, than the circuit arrangement is capable of producing.

It is an object of the invention to enable the oscillator arrangement to be driven into a maximum in normal operation, the currents occurring in the crystal circuit consequently exhibiting their maximum admissible value, but to prevent the temporary occurrence of larger currents, and the invention is characterized in that a unilaterally conductive element is connected in series with the crystal, which element is bridged by the series combination of a voltage supply and a resistance which is high compared with the resistance of the unilaterally conductive element in the pass direction, the voltage supply producing a direct current in the unilaterally conductive element the value of which is substantially equal to the amplitude of the maximum admissible current in the crystal circuit.

Figure 1:
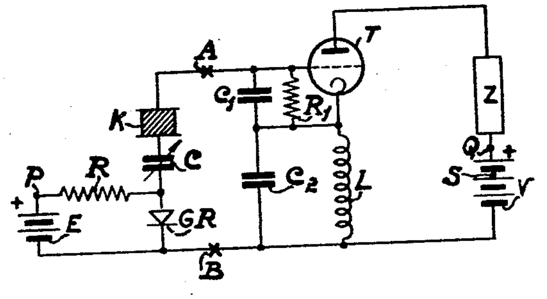
Figure 2:
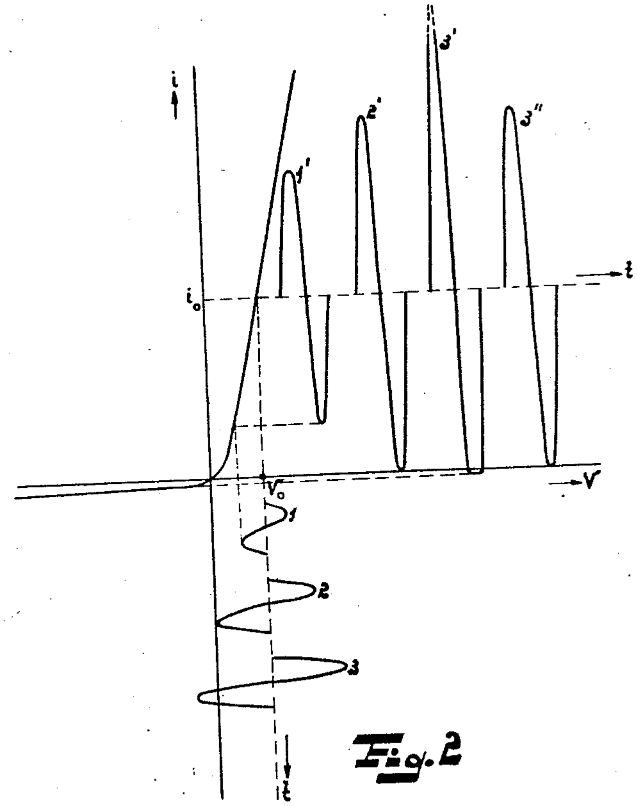

The invention will now be described with reference to the accompanying drawing, in which Fig. 1 shows an arrangement according to the invention, and Fig. 2 is a diagram illustrating the operation of a circuit arrangement according to the invention.

Fig. 1 shows an embodiment in which a so-called Colpitts oscillator is used. In this figure V designates a source of voltage supply, T an amplifier tube; a crystal K and capacitors $C_1$ and $C_2$ together with T constitute the oscillator arrangement. $R_1$ is a leakage resistor which produces the required grid bias voltage, C is a variable capacitor permitting the frequency of the produced oscillations to be adjusted. Z designates the load impedance and L is a coil which offers a low impedance to the direct current supply but a high one to the produced oscillations.

The crystal circuit is provided between points A and B. In order to protect the crystal K from currents passing through it the amplitude of which exceeds the maximum admissible amplitude the crystal has connected to it in series a unilaterally conductive element, for example a germanium diode, GR which is bridged by the series combination of a voltage supply E and a resistor R which is high compared with the resistance of the unilaterally conductive element GR in the pass-direction. R may, for example, be the internal impedance of the voltage supply E.

The voltage-current characteristic curve of such a unilaterally conductive element is shown in Fig. 2. Let $V_0$ be the direct voltage set up across the element GR, $i_0$ being the associated direct current such that $i_0$ at a maximum is equal to the amplitude of the maximum admissible current in the crystal circuit.

The oscillator generates alternating voltages which are also active across the element GR. Assuming now that the amplitude of these voltages is smaller than or equal to $V_0$, as is shown in the figure by 1 and 2, the associated alternating currents passing through GR and indicated in the figure by 1′ and 2′ have amplitudes which are smaller than or equal to $i_0$. However, if now for some reason or other the voltage across the points A and B (Fig. 1) increases, the voltage across GR also increases in a manner such that the amplitude exceeds $V_0$ (Fig. 2, reference number 3); the alternating current passing through the crystal circuit will also tend to increase, namely, in the absence of the crystal, according to 3′. However, this alternating current is greatly deformed substantially by even harmonics due to the blocking action of the element GR, which blocking action is not removed by the presence of the bridge E and R, since R has been made high. However, the occurrence of these higher harmonics is prevented substantially entirely by the efficient filter action of the crystal, so that the resultant current 3″ remains sinusoidal and naturally has an amplitude equal to $i_0$. Obviously, the influence of the fact that the resistance of the element GR in the blocking direction and the resistance of R are not infinite has been neglected. As a result the maximum alternating current set up will have an amplitude slightly exceeding $i_0$. Consequently $i_0$ will be made slightly smaller than the maximum admissible amplitude of the alternating current in the crystal circuit.

In addition, it will be obvious that for supplying the direct current flowing through the unilaterally conductive element GR use can be made not only of a separate voltage supply E but also of the supply voltage source V. In this event the terminal P of resistor R is not connected to the positive terminal of E but to the positive terminal Q of V, or, if only part of the voltage is to be used, to a terminal S of V.

What is claimed is:

1. A protective circuit for the crystal in a crystal-controlled oscillator, comprising a unilaterally conductive element connected in series with said crystal, and a series combination of a voltage source and a resistance, said series combination being connected in parallel with said unilaterally conductive element.

2. A protective circuit as claimed in claim 1, in which the value of said resistance is greater than the resistance of said unilaterally conductive element in its current-passing direction, and in which said voltage source produces a direct voltage having a value and polarity to cause a direct current to flow in the current-passing direction of said unilaterally conductive element, said current having a value substantially equal to the maximum permissible current in said crystal.

References Cited in the file of this patent

UNITED STATES PATENTS 2,553,366 Fry ---------------- May 15, 1951